Patented Dec. 1, 1931

1,834,015

UNITED STATES PATENT OFFICE

FRITZ BALLAUF AND ALBERT SCHMELZER, OF ELBERFELD, GERMANY, ASSIGNORS TO GENERAL ANILINE WORKS, INC., OF NEW YORK, N. Y., A CORPORATION OF DELAWARE

MANUFACTURE OF HYDROXY CARBAZOLES

No Drawing. Application filed July 19, 1930, Serial No. 469,278, and in Germany June 29, 1929.

The present invention relates to the production of hydroxy carbazoles and more particularly it relates to a process for preparing 2- or 3-hydroxy-carbazole from the corresponding 2- or 3-alkoxy-tetrahydro-carbazole. According to the present invention a compound of the general formula:

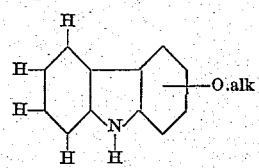

wherein O.alk stands for an alkoxy group which stands in the 2- or 3-position is heated in the presence of at least the calculated quantity of lead oxide at a temperature of 400–600° C. until a gas consisting probably of a mixture of carbon dioxide and water-steam no longer escapes from the reaction mixture.

As starting materials for performing the present invention the following compounds among others may be used:

2-methoxy-tetrahydro-carbazole,
3-methoxy-tetrahydro-carbazole,
2-ethoxy-tetrahydro-carbazole,
3-ethoxy-tetrahydro-carbazole,
2-isopropoxy-tetrahydro-carbazole,
3-isobutoxy-tetrahydro-carbazole.

Our invention is illustrated by the following example without being restricted thereto:

*Example:* 20 parts by weight of ar-6-methoxy-tetrahydro-carbazole are intimately mixed with 70 parts by weight of lead oxide and introduced into a glass tube. The remainder of the tube is then filled with lead oxide-pumice stone particles. The glass tube is placed in a brass tube or in a tube of fireclay in order to ensure a uniform heating. The distillation is then carried out in the manner usual for this reaction, that is to say the lead oxide-pumice stone mixture present is first well heated and then the substance is rapidly distilled over the lead oxide, advantageously in a current of inert gas, such as for example, carbon dioxide or nitrogen. The yield of the crude product is good. By recrystallizing from xylene, 3-hydroxy-carbazole is obtained in white needles of the melting point 256° C. It is identical in every respect with the 3-hydroxy-carbazole described in the literature. The 3-methoxy-carbazole obtained therefrom by methylation according to the customary methods crystallizes from alcohol in white needles of the melting point 142° C. This is likewise identical with the methoxy carbazole described in the literature.

In an analogous manner 2-hydroxy-carbazole can also be obtained from the 2-ethoxy-tetrahydrocarbazole.

We claim:

1. Process for preparing a compound of the general formula:

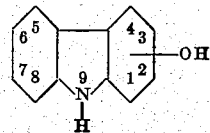

wherein the hydroxy group stands in 2- or 3-position which comprises heating to a temperature of 400–600° C. a tetrahydrocarbazole compound of the general formula:

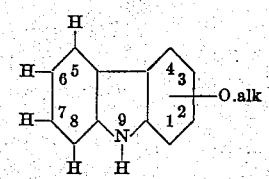

wherein O.alk stands for an alkoxy group which stands in the 2- or 3-position in presence of at least the calculated quantity of lead oxide until a gas consisting probably of carbon dioxide and water-steam no longer escapes from the reaction mixture.

2. Process for preparing 3-hydroxy-carbazole which comprises heating a 3-alkoxy-tetra-hydro-carbazole at a temperature of 400–600° C. in the presence of at least the calculated quantity of lead oxide until a gas consisting probably of carbon dioxide and water-steam no longer escapes from the reaction mixture.

In testimony whereof, we affix our signatures.

FRITZ BALLAUF.
ALBERT SCHMELZER.